(12) United States Patent
Privitt et al.

(10) Patent No.: US 9,983,953 B2
(45) Date of Patent: May 29, 2018

(54) MULTIPLE COMPUTER SYSTEM PROCESSING WRITE DATA OUTSIDE OF CHECKPOINTING

(71) Applicant: INTEL CORPORATION, Santa Clara, CA (US)

(72) Inventors: Kenneth W. Privitt, San Diego, CA (US); Scott M. Rider, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 476 days.

(21) Appl. No.: 13/722,655

(22) Filed: Dec. 20, 2012

(65) Prior Publication Data

US 2014/0181435 A1    Jun. 26, 2014

(51) Int. Cl.
*G06F 12/00* (2006.01)
*G06F 11/16* (2006.01)
*G06F 11/20* (2006.01)
*G06F 11/14* (2006.01)

(52) U.S. Cl.
CPC ........ *G06F 11/1666* (2013.01); *G06F 11/202* (2013.01); *G06F 11/2097* (2013.01); *G06F 11/1456* (2013.01); *G06F 11/1641* (2013.01); *G06F 11/1658* (2013.01)

(58) Field of Classification Search
CPC ... G06F 12/16; G06F 11/1641; G06F 11/1456
USPC ......................................................... 711/162
See application file for complete search history.

(56) References Cited

U.S. PATENT DOCUMENTS

| | | | | |
|---|---|---|---|---|
| 5,163,138 | A | * | 11/1992 | Thirumalai ........... G06F 11/165 710/316 |
| 5,692,121 | A | * | 11/1997 | Bozso ................. G06F 11/1641 714/10 |
| 5,953,742 | A | | 9/1999 | Williams |
| 6,401,158 | B1 | | 6/2002 | Maruska et al. |

(Continued)

FOREIGN PATENT DOCUMENTS

CN        1794196        6/2006

OTHER PUBLICATIONS

International Search Report and Written Opinion for International Application No. PCT/US2013/048374, dated Oct. 18, 2013, 11 pp. [77.282PCT (ISR & WO)] .

(Continued)

*Primary Examiner* — Brian R Peugh
(74) *Attorney, Agent, or Firm* — Konrad Raynes Davda & Victor LLP; David W. Victor (57) ABSTRACT

The disclosure describes a system including a first computer system including a first memory controller and a first inter-computer transfer interface to send information about write operations over an interconnect to a second computer system. A second computer system includes a second memory controller and a second inter-computer transfer interface to receive the information about the write operations over an interconnect, wherein the write operations are duplicated through the second memory controller. In other embodiments, a system includes a first computer system including a first memory controller and a first inter-computer transfer interface to send information about write operations of the first computer system during a lockstep operation. Still other embodiments are described.

24 Claims, 5 Drawing Sheets

(56) References Cited

U.S. PATENT DOCUMENTS

| | | | |
|---|---|---|---|
| 7,500,139 B2 | 3/2009 | Mizutani | |
| 8,032,762 B2* | 10/2011 | Shingal | H04L 9/065 380/28 |
| 2002/0112110 A1* | 8/2002 | Maruska | G06F 13/409 710/305 |
| 2003/0126388 A1* | 7/2003 | Yamagami | G06F 11/2058 711/162 |
| 2004/0153750 A1 | 8/2004 | Aino et al. | |
| 2005/0076287 A1* | 4/2005 | Mantong | H04L 29/06 714/758 |
| 2005/0138308 A1* | 6/2005 | Morishita et al. | 711/162 |
| 2006/0242461 A1 | 10/2006 | Kondo et al. | |
| 2006/0253733 A1 | 11/2006 | Galipeau et al. | |
| 2007/0028144 A1 | 2/2007 | Graham et al. | |
| 2008/0126690 A1* | 5/2008 | Rajan et al. | 711/105 |
| 2009/0024836 A1* | 1/2009 | Shen et al. | 712/211 |
| 2009/0300304 A1* | 12/2009 | Boyd et al. | 711/162 |
| 2012/0297107 A1 | 11/2012 | Mathew et al. | |

OTHER PUBLICATIONS

International Preliminary Report on Patentability for International Application No. PCT/US2013/048374, dated Jul. 2, 2015, 8 pp. [77282PCT (IPRP)].

Office Action 1 for KR Application No. 10-2015-7011164, dated Mar. 16, 2016, 13 pp. [77.282KR (OA1)], Translation included.

U.S. Pat. No. 7,500,139, dated Mar. 3, 2009, is an English Language equivalent of CN Publication No. 1794196, dated Jun. 28, 2006.

Office Action 1 for CN Application No. 201380060686.7, dated Nov. 2, 2016, 26 pp. (w/ English Translation) [77282CN (OA1)].

Final Office Action 1 for KR Application No. 10-2015-7011164, dated Sep. 21, 2016, 6 pp. (w/ English Translation and English Summary of OA) [77.282KR (FOA1)].

Response to Final Office Action 1 for KR Application No. 10-2015-7011164, dated Oct. 21, 2016, 20 pp. (w/ EnglishTranslation and English Claims) [77.282KR (RFOA1)].

Notice of Allowance 1 for KR Application No. 10-2015-7011164, dated Nov. 24, 2016, 6 pp. (W/ English Translation and English Claims) [77.282KR (NOA1)].

Response to Office Action 2 for CN Application No. 201380060686.7, dated Sep. 11, 2017, 8 pp. (w/ English Machine Translation) [77.282CN (ROA2)].

Office Action 2 for CN Application No. 2013800606867, dated Jun. 27, 2017, 21 pp. (w/ English Translation) [77.282CN (OA2)].

Response to Office Action 1 for KR Application No. 10-2015-7011164, dated May 13, 2016, 19 pp. (W/ English Translation of Claims).

Final Office Action 1 for CN Application No. 201380060686.7, dated Jan. 10, 2018, 20 pp. (w/ Machine Translation).

\* cited by examiner

MULTIPLE COMPUTER SYSTEM PROCESSING WRITE DATA OUTSIDE OF CHECKPOINTING

BACKGROUND

Technical Field

The disclosure relates generally to high reliability, multiple computer systems and more particularly to high reliability, multiple computer systems in which write data is processed (compared or copied) outside of checkpoint operations.

Background Art

Currently, some high reliability computers use a process known as checkpointing to keep a second computer in software lockstep with a first computer. Periodically, the first computer is stopped and the Central Processing Unit (CPU) state and any changes to the first computer's memory since the last checkpoint are transferred to the second computer. In the event of a failure or unrecoverable error on the first computer, the second computer will continue execution from the last checkpoint. Through frequent checkpointing, a second computer can take over execution of a user's application with little noticeable impact to the user.

Memory controllers are included in computer CPUs to access a separate attached external system memory. In most high performance computer systems, the CPU includes an internal cache memory to cache a portion of the system memory and uses the internal cache memory for the majority of all memory reads and writes. When the internal cache memory is full of changed data and the CPU desires to write additional changed data to the cache, the memory controller writes a copy of some of the cache content to external system memory.

High reliability computers use mirrored memory. A computer may have memory configured to be in "mirror" mode. When memory is in mirrored mode, the memory controller which is responsible for reading the contents of external memory to the CPU or writing data to the external memory from the CPU writes two copies of the data to two different memory locations, a primary and secondary side of the mirror. When the memory controller is reading the data back into the CPU, it only needs to read one copy of the data from one memory location. If the data being read from the primary side has been corrupted and has uncorrectable errors in the data, the memory controller reads the mirror memory secondary location to get the other copy of the same data. As long as the memory controller is performing a read operation, the controller only needs to read from a single memory location. Whenever the memory controller is performing a write operation (transaction), it writes a copy of the data to both the primary and secondary side of the mirror. The process of making two or more copies of data for enhanced reliability is referred to as mirroring and sometimes Redundant Array of Independent Disks (RAID 1). It is not necessary that the primary and secondary side of the mirror are on different physical memory devices.

Figure 1:
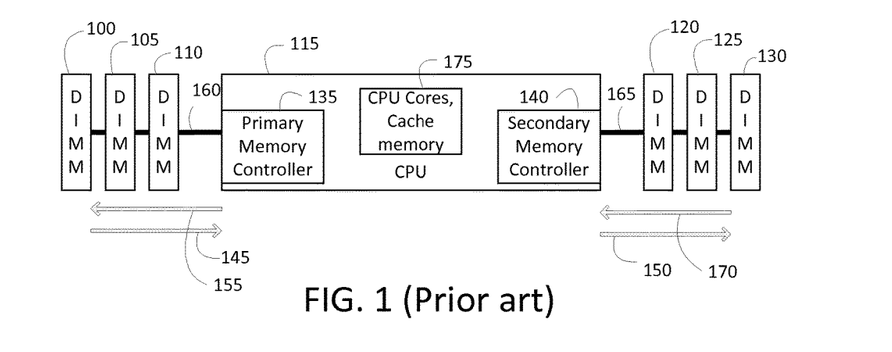
FIG. 1 is a block diagram representation of a prior art high reliability computer using memory mirroring.

FIG. 1 is a prior art block diagram illustrating a prior art computer system with mirrored memory. Memory modules 100, 105, and 110 are the primary side of the memory in a computer system and memory modules 120, 125, and 130 are the secondary side of the memory. Other systems have a different number of memory modules. CPU 115 includes cores and cache memory 175 (as well as other components), a primary memory controller 135 coupled to the primary memory through interface 160, and a secondary memory controller 140 coupled to the secondary memory through interface 165. Different systems have different types and numbers of interfaces. Further, the primary and secondary memory controllers 135 and 140 could be two different memory controllers or two features of a single memory controller.

In mirroring, primary memory controller 135 and secondary memory controller 140 transfer the same data to the primary and secondary side of the memory so that the data is maintained in two copies in independent memory modules after each memory write operation. During a memory read operation 145, data is transferred from a memory module 100, 105, or 110 to primary memory controller 135. In the event that the data is determined to be correct, no further actions are necessary to complete the read operation. In the event that the data is determined to be corrupted, a read 170 may be performed by the secondary memory controller 140 from a memory module 120, 125, or 130 on the secondary side of the memory which contains a copy of the data stored on the primary side of the memory. This leads to higher reliability because even if data in on the primary side of memory is corrupted, a copy may be read from the secondary side that is probably not corrupted.

Checkpointing transfers or compares changed data between the first and the second computer. High reliability computers using checkpointing transfer data between the first computer and the second computer. An interface such as InfiniBand, PCI-Express (PCIe), or a proprietary interface between the computers is used to transfer the CPU state and the system memory content during the checkpointing process. The first computer's CPU or Direct Memory Access (DMA) controller is usually used to transfer the contents of memory to the second computer. Various methods are used to save time transferring the content of memory from the first computer to the second computer. For example, a memory paging mechanism may set a "Dirty Bit" to indicate that a page of memory has been modified. During checkpointing, only the pages of memory with the Dirty Bit set will be transferred. A page could be 4 Kilobytes, 2 Megabytes, 1 Gigabyte or some other size. The DMA device or processor copies the entire region of memory that has been identified by a Dirty Bit regardless of whether the entire page has been changed or only a few bytes of data in the page have changed.

Checkpointing reduces the computer performance. While the computer is performing the checkpointing task, it generally is not doing useful work for the user, so the user experiences reduced performance. There is always a tradeoff between frequency of checkpointing intervals, complexity of the method to efficiently transfer checkpoint data, and latency delays that the user experiences. Minimum latency can be realized by only transferring the data that has been changed in the computer memory.

Checkpointing may be used when both the first computer and the second computer are executing the same instructions. When both computers are executing the same code at the same time, they may be periodically stopped and the contents of the CPU registers and memory contents compared with each other. If the computers have identical CPU register values and memory contents, they are allowed to continue processing. When both computers are comparing memory and register values, a low latency comparison exists when only the data that has been changed is compared between the two systems. Various methods have been used in the prior art to reduce the amount of time necessary to copy the contents of external memory to the second computer.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

This disclosure relates to high reliability computer architectures. Specifically, this disclosure describes a low latency method of checkpointing to keep two computers in lockstep. In some embodiments (online, offline mode), the checkpointing operation can be performed faster because data is transferred during normal operation and does not need to be transferred during the checkpoint operation. In other embodiments (software lockstep mode), data does not need to be compared during the checkpoint operation because the data is compared during normal operation.

Memory controllers typically write only changed or new data to main memory (external memory modules), and when the system is using mirrored memory, the memory controller writes a duplicate copy of the new or changed data to both the primary and the secondary side of the mirror. By modifying the memory controller or the memory device to transfer data to a second computer while writing the data to memory, checkpointing overhead is reduced or eliminated for the memory copy portion of checkpointing.

In some embodiments, a form of checkpointing (offline checkpointing) is used in which a first computer system (online system) runs a user's application and periodically stops to copy internal and external data and the CPU state to a second computer (offline system). The need to transfer memory contents during the checkpoint operation is reduced or eliminated by transferring data from the online system to the offline system during each memory write operation (transaction) while the computer system is running the user's application.

In other embodiments, another form of checkpointing is used in which both a first and a second computer system are running a user's application concurrently (software lockstep mode). Periodically, both computer systems are stopped at the same time and point in an application. One system may be slightly ahead or behind the other system, so the system that is behind is allowed to run additional instructions until the two systems are stopped on the same instruction. Then the internal and external memory and CPU state are compared. Some embodiments reduce the need to compare external memory contents during the checkpoint operation by performing the external memory compare every time data is written to memory. Some embodiments only support software lockstep mode and other embodiments only support online, offline mode. Still other embodiments support both software lockstep mode and online, offline mode.

Figure 2:
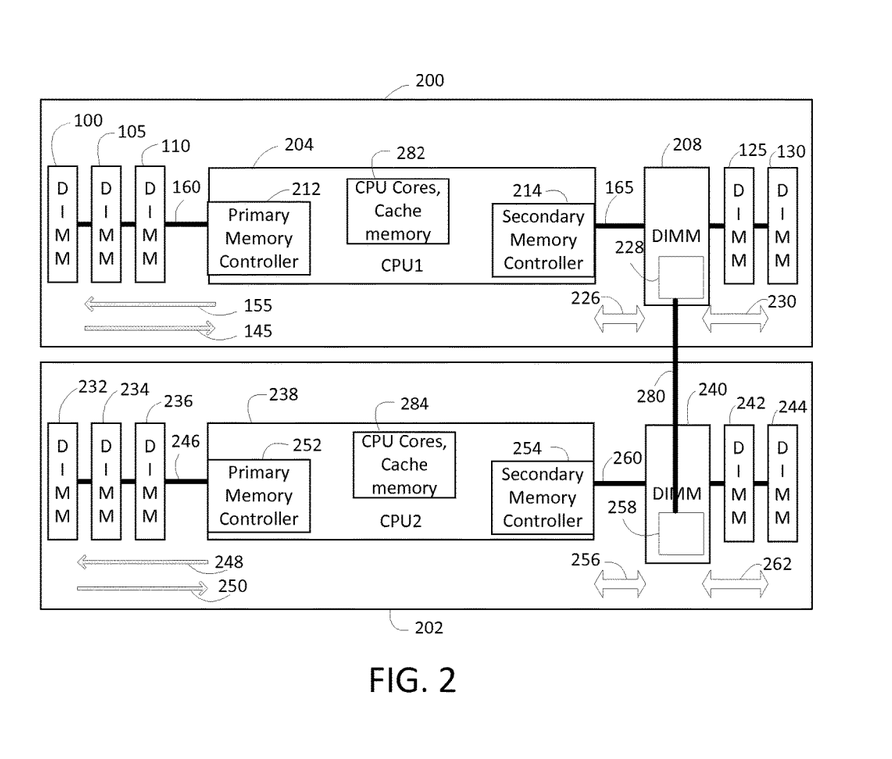
FIG. 2 is a block diagram representation of a high reliability dual computer system according to some embodiments of the invention.

FIG. 2 is a block diagram illustrating some embodiments of a low overhead checkpointing system. FIG. 2 may be used to implement either form of checkpointing (software lockstep or online, offline modes) and variations of them described below.

In FIG. 2, primary system 200 includes CPU1 204, memory modules 100, 105, and 110 on the primary memory side, and memory modules 208, 125, and 130 on the secondary memory side. CPU1 includes cores and cache memory 282 (which may be the same as or different than cores and cache memory 175), primary memory controller 212 and secondary memory controller 214—as well as various other components. Primary and secondary memory controllers 212 and 214 may be on the same die as CPU Cores and cache memories or on a different die. Primary and secondary memory controllers 212 and 214 may be separate memory controllers or two features of the same memory controller. CPU1 204, primary and secondary memory controllers 212 and 214 may be the same as or different than CPU 204, primary and secondary memory controllers 212 and 214 in FIG. 1.

Secondary system 202 includes CPU2 238, memory modules 232, 234, and 236 on the primary memory side, and memory modules 240, 242, and 244 on the secondary memory side. CPU2 includes CPU cores and cache memories 284 (which may be the same as or different than cores and cache 282), primary memory controller 252 and secondary memory controller 254 and other components.

Memory module 208 includes memory devices and inter-memory transfer interface 228, and memory module 240 includes memory devices and inter-memory transfer interface 258.

In some embodiments, primary memory controller 212 and secondary memory controller 214 transfer the same data to the primary and secondary side of the memory so that the data is maintained in two copies in independent memory modules during each memory write operation.

Figure 8:
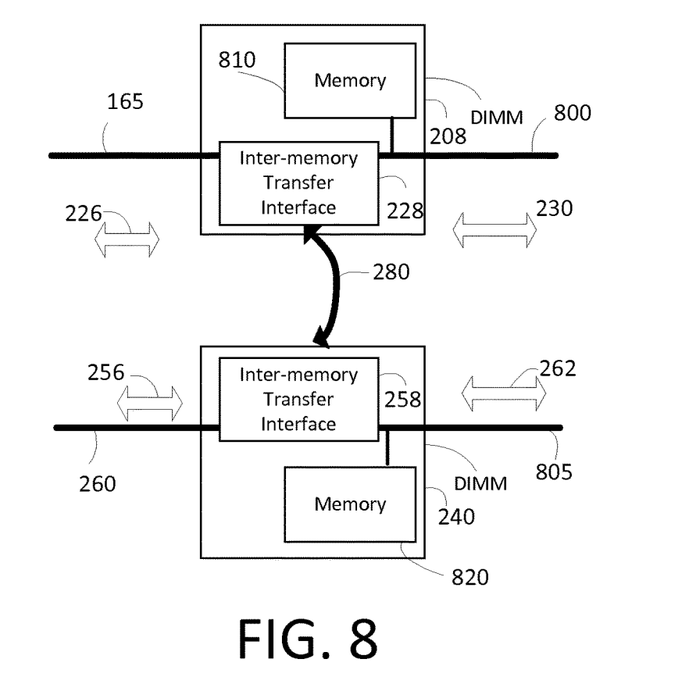
FIG. 8 is a block diagram representation of further details of FIG. 2 according to some embodiments of the invention.

There are different ways in which memory write operations may be performed in different embodiments. FIGS. 8 and 9 illustrate some of these. Referring to FIGS. 2 and 8, during a memory write operation, CPU1 204 transfers data by writing 155 to a memory module 100, 105, or 110 on the primary side of the memory using memory interconnect 160. Concurrently with the write 155 to the primary side of the memory, CPU1 204 transfers data by writing 226 to inter-memory transfer interface 228 in memory module 208 on the secondary side using memory interconnect 165. Data is transferred 230 to memory in memory module 208, 125, or 130. During the write 226 process, inter-memory transfer interface 228 on memory module 208 signals secondary system 202 with information about the write using private interface 280 (which is an example of an interconnect). Secondary system inter-memory transfer interface 258 receives the information about the write over private interface 280. The inter-memory transfer interface 258 on secondary system secondary side memory module 240 performs a write 262 to memory in secondary side memory modules 240, 242, or 244. Note that memory controller 254 may be the same as or different than memory controller 214. Likewise, memory controllers 212 and 214 may be the same as each other or different and memory controllers 252 and 254 may be the same as or different (and may be separate memory controllers or two features of the same memory controller). The inter-memory transfer interfaces may be, for example, Application Specific Integrated Circuits (ASIC)s, Field Programmable Gate Arrays (FPGA)s, or integrated into the Dynamic Random Access Memory (DRAM) devices.

In some embodiments for online, offline mode, secondary memory controller 254 in system 202 receives information 256 from inter-memory transfer interface 258 and causes CPU2 238 to write the same data to the primary side memory modules 232, 234, or 236 using primary memory controller 252. Upon completion of the writes 155, 226, 230, 262, and 248, the memory contents of the secondary system will be the same as the memory contents of the primary system. During the next offline checkpointing event, in some embodiments, there will be no need to transfer memory content or compare memory content because every write operation on the primary system has been repeated on the secondary system.

In some embodiments for online, offline mode, the secondary system inter-memory transfer interface 258 does not cause the data to be written to the primary side of the mirror so that the primary side contains the memory image of the last checkpoint operation. Write information provided over interface 280 is written to memory modules 240, 242, or 244 but is not transferred by CPU2 238 to the secondary system, primary memory. As the primary system runs, there is a possibility that there will be incorrect data written to the memory. If incorrect data is written to both sides of the mirrored memory on the primary system 200, and a copy of the bad data is written to the secondary system 202, there is a correct copy of data on the primary side of the mirror on the secondary system 202. To recover data or the operation during a checkpoint operation, the data from the previous checkpoint operation may be read from the secondary system 202 primary memory controller 252. In some embodiments, when data is only written to the secondary memory, during checkpointing the changed data on the secondary side of the mirror can be transferred to the primary side, thus preserving the previous checkpointed data on the primary side until it is safe to update with the changed data on the other side.

Figure 9:
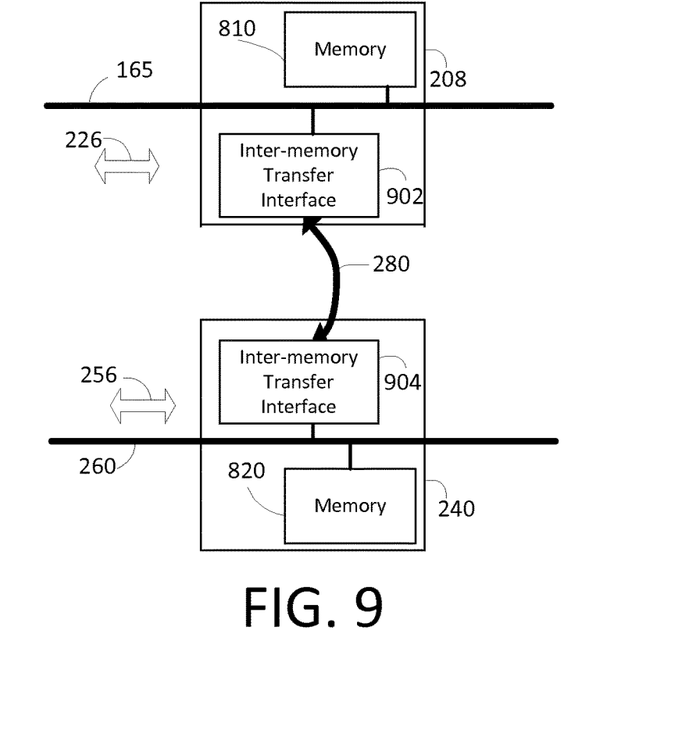
FIG. 9 is a block diagram representation of further details of FIG. 2 according to some embodiments of the invention.

In some embodiments using the software lockstep mode, primary computer system 200 and secondary computer system 202 execute the same user program and run in software lockstep. Each computer system executes the same instructions at almost the exact same time. When the primary computer system 200 and the secondary computer system 202 write data to the primary system, secondary memory (in module 208, 125 or 130) and the secondary system, secondary memory (in module 240, 242, or 244), inter-memory transfer interface 228 and the inter-memory transfer interface 258 may compare the write information from transactions 226 and 256 when the write operations occur. During the next software lockstep checkpoint operation, memory contents do not need to be compared because every write occurring in the first system is compared to every write occurring in the second system concurrently with the writes by the inter-memory transfer interfaces 228 or 258 or both 228 and 258. Therefore, during the next checkpoint operation, there is no need to compare the physical memory because all write accesses to the memory were compared so the contents should be the same. The comparison of information related to write operations may be of the entire provided write information or merely a portion of it. Accordingly, at least some of the information is compared Referring again to FIGS. 2 and 8, in FIG. 8, writes pass through inter-memory transfer interfaces 228 and 258 before passing to memory 810 and 820 or other memory in modules 125, 130, 242, or 244 on interfaces 800 or 805. When information is received over private interface 280, a write to memory 230 or 262 can occur without using connection 165 or 260. Likewise, read data from modules 125, 130, 242, or 244 pass through interfaces 228 or 258 before being passed on interface 165 or 260. By contrast, in FIG. 9, data can be written to or read from memory 810, 904, or memory in modules 125, 130, 242, or 244 without passing through inter-memory transfer interfaces 902 or 904. Note that interfaces 902 and 904 may be the same as or different than interfaces 228 and 258.

Figure 3:
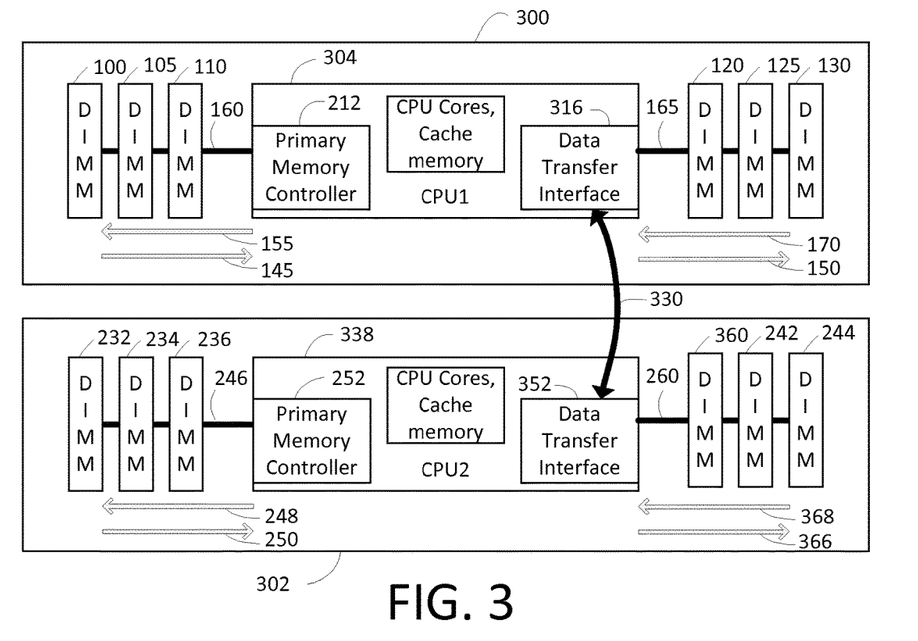
FIG. 3 is a block diagram representation of a high reliability dual computer system according to some embodiments of the invention.

FIG. 3 illustrates some alternative embodiments. Referring to FIG. 3, primary system 300 and secondary system 302 are like systems 200 and 202 of FIG. 2 except that inter-memory interfaces 228 and 258 are not included in FIG. 8, and memory controllers 214 and 254 or FIG. 2 are replaced with data transfer interfaces 316 and 352 in FIG. 3. Further, private interface 280 is replaced with private interface 330 (which is an example of an interconnect) in the system of FIG. 3. Also, in FIG. 8, module 120 and 230 replace modules 208 and 240 of FIG. 2. (Note that although the modules are labeled Dual Inline Memory Modules (DIMM)s, they do not have to be DIMMs.)

In online, offline mode, during a memory write operation, CPU 304 transfers data by writing 155 to a memory module 100, 105, or 110 on the primary side of the memory using memory interconnect 160. Concurrently with the write 155 to the primary side of the memory, data transfer interface 316 transfers data by writing 150 to a memory module 120, 125, or 130 on the secondary side of the memory using memory interconnect 165. During the write 150 process, data transfer interface 316 signals secondary system 302 with information about the write using private interface 330. Secondary system data transfer interface 352 receives the information about the write from private interface 330. The data transfer interface 352 on secondary system CPU2 338 performs a write 366 to secondary side memory device 360, 242, or 244 and in some embodiments causes primary memory controller 252 to write (248) the same information to the primary memory in module 232, 234, or 236.

In some embodiments of online, offline mode, secondary system data transfer interface 352 transfers the information about the write from private interface 330 to the primary memory in module 232, 234, or 236 and secondary memory in module 360, 242, or 244 so that the data is maintained in two copies in independent memory modules during each memory write operation.

In some embodiments of online, offline mode, secondary system data transfer interface 352 transfers the signaled data from private interface 330 data to only the secondary 360, 242, and 244 side of the memory, preserving the contents of the primary side of the memory until the checkpointing process allows the changed data to be written to the primary side of the memory.

In some embodiments of the software lockstep mode, primary system 300 and secondary system 302 are running the same user application concurrently in software lockstep.

When the two systems perform write operations (155, 150, 248, and 366) to primary and secondary memory, the primary system data transfer interface 316 and/or secondary system data transfer interface 352 compare information about write operations using information provided over private interface 330. During a software lockstep checkpoint operation, the contents of memory may not need to be compared because during each write operation while the primary and secondary systems are running, the write data is compared.

Figure 4:
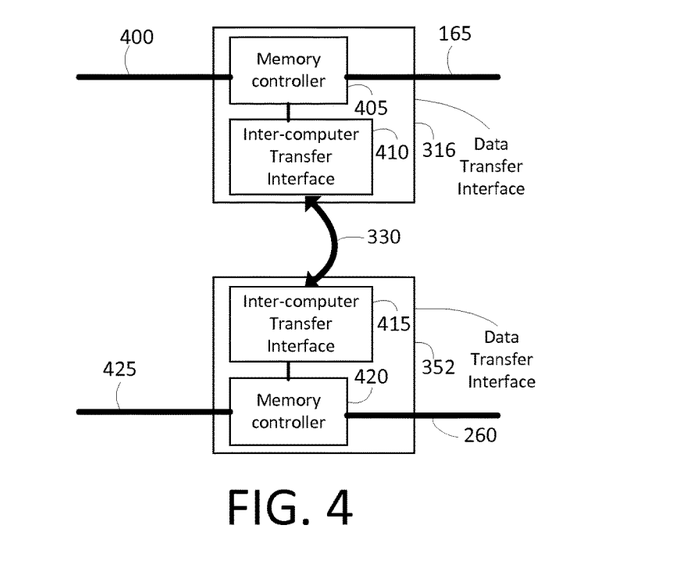
FIG. 4 is a block diagram representation of further details of FIG. 3 according to some embodiments of the invention.

FIG. 4 provides additional detail of some embodiments of FIG. 3. Data transfer interface 316 includes a memory controller 405 and an inter-computer transfer interface 410. Data transfer interface 352 includes a second inter-computer transfer interface 415 and a memory controller 420. First inter-computer transfer interface 410 detects when a write occurs from CPU 304 over interface 400 to memory controller 405. Information about the write, such as the data being written, the address in memory it is being written to, and, optionally, the time that the data write occurred is transferred to the second inter-computer transfer interface 415 using a private interface 330.

In some embodiments in on-line offline mode, when interface 415 receives from interface 410 information about a data write, that interface 415 causes the second memory controller 420 to write a copy of the data from interface 410 to the second system memory attached to memory interface 260.

In some embodiments when systems 300 and 302 are operating in software lockstep, interface 410 detects when CPU 304 writes to memory controller 405. Information about the write, such as the data being written, the address in memory it is being written to, and, optionally, the time that the data write occurred is transferred by interface 410 to interface 415 using private interface 330. Interface 415 detects when CPU 338 writes over interface 425 to memory controller 420. Information about the write, such as the data being written, the address in memory it is being written to, and, optionally, the time that the data write occurred is compared to the information signaled from interface 410. If the data is the same, the memory does not need to be compared during the next software lockstep checkpoint because all of the changed values were compared when written to memory, thus reducing the time needed to perform software lockstep checkpointing. The comparison can be performed in interface 410 or in 415 or in both 410 and 415. In alternative embodiments, the comparison could be performed in other circuitry of the system outside the interfaces. For example, the comparison could be performed in the cores, the memory controller, or other circuitry of the CPUs.

Figure 5:
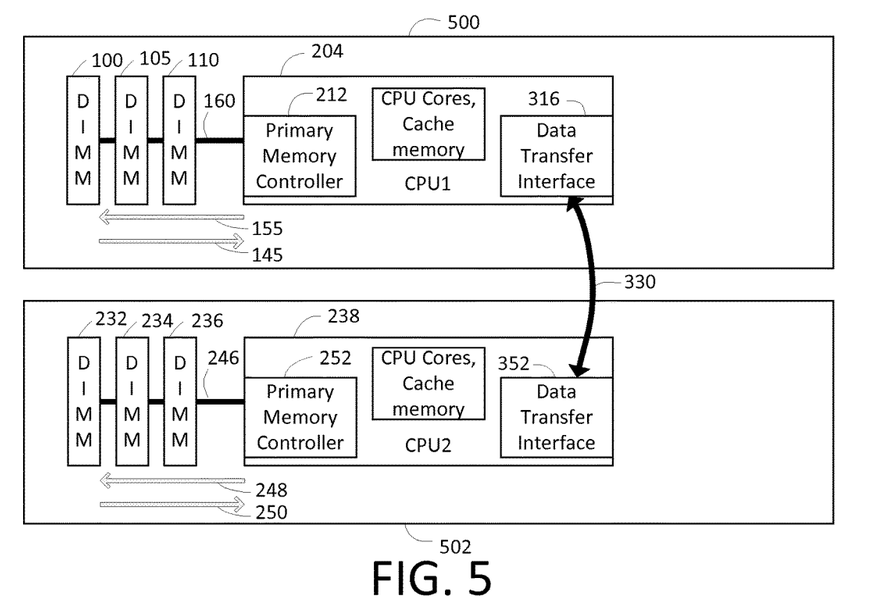
FIG. 5 is a block diagram representation of a high reliability dual computer system according to some embodiments of the invention.

FIG. 5 illustrates other embodiments. FIG. 5 is similar to FIG. 3 except that systems 500 and 502 do not include memory modules connected to the data transfer interfaces 316 and 352. Accordingly, there will be writes to the primary side of the second system 502 in on-line, offline mode.

Figure 6:
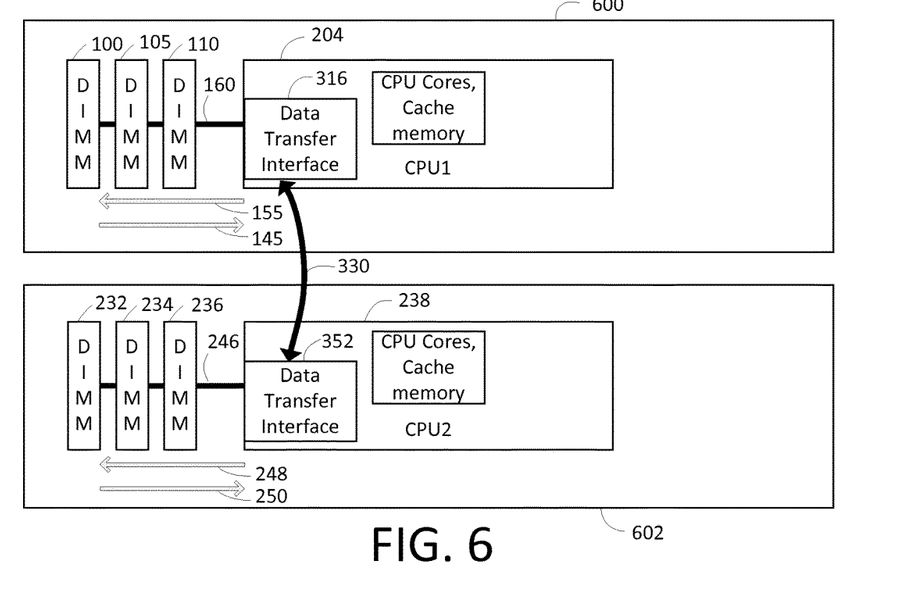
FIG. 6 is a block diagram representation of a high reliability dual computer system according to some embodiments of the invention.

FIG. 6 illustrates other embodiments. FIG. 6 is similar to FIG. 5 except that in systems 600 and 602, the data transfer interface 316 and 352 replace memory controllers 212 and 252. In still other embodiments, systems like those in FIG. 3 could have data transfer interfaces 316 and 352 on the primary side and memory controllers 212 and 252 on the secondary side.

Figure 7:
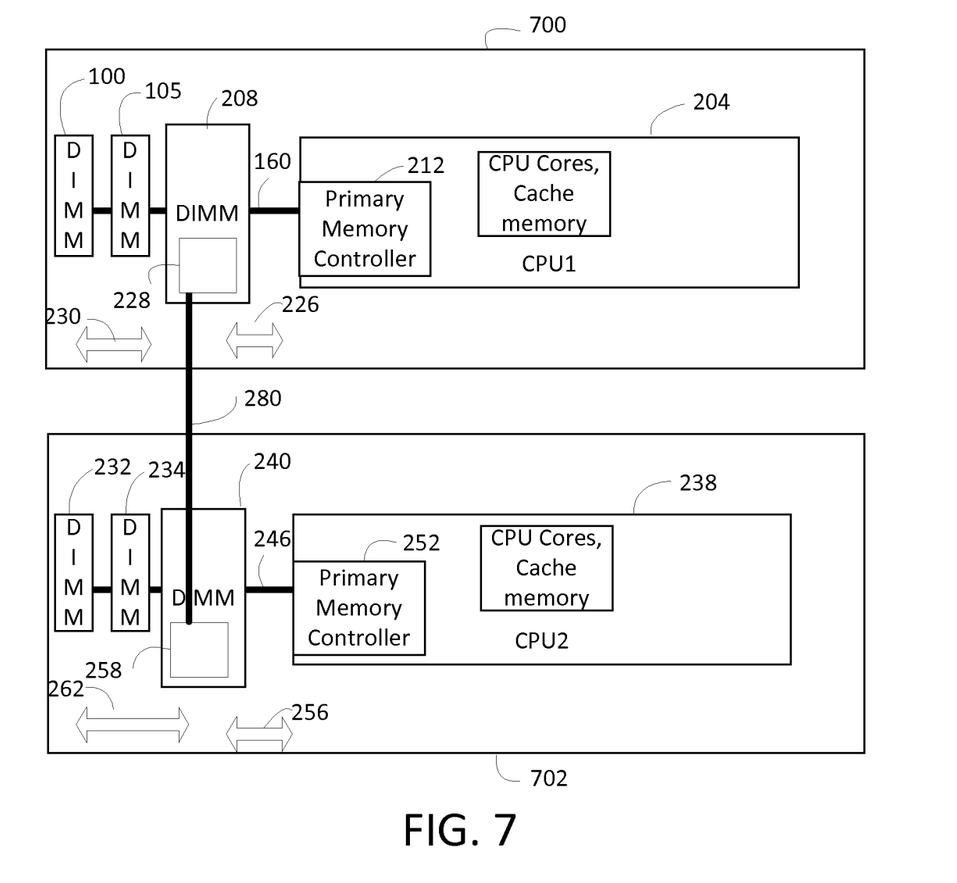
FIG. 7 is a block diagram representation of a high reliability dual computer system according to some embodiments of the invention.

FIG. 7 illustrates other embodiments. FIG. 7 is similar to FIG. 2, except that modules 208 and 240 are on the primary side and there is not secondary side. In some embodiments, there could also be a secondary side. In other words, in FIG. 2, modules 208 and 240 could be swapped with modules 110 and 236 with private interface 280 being moved as well.

Although interface 330 is referred to as a private interface, in some embodiments, it may carry signals in addition to those described herein (e.g., for functions unrelated to those described herein). Likewise, in some embodiments, interface 280 may carry signals in addition to those described herein.

In some embodiments, when in on-line, offline mode, during a checkpointing operation, some data may be transferred between primary and second systems even if the copies have been made while the on-line system has been running. In other words, even though embodiments of the invention significantly reduce the number of data transfers during the checkpoint operation, in some embodiments, they might not eliminate all data transfers.

Reads can be switched back and forth between primary and secondary sides to balance wear, power consumption and other factors not related to this disclosure.

A memory chip may be comprised of Dynamic Random Access Memory (DRAM), Static Random Access Memory (SRAM), Flash memory, Read-Only memory (ROM), Phase Change memory, or other forms of memory.

A memory module typically includes multiple memory chips arranged to facilitate access to the memory chips on a small circuit board. A memory module may include a buffer chip to facilitate access to memory chips. A "Dual In-line Memory Module (DIMM)" is an example of a memory module.

A computer system may have a single Central Processing Unit (CPU), or multiple CPUs.

"Logic" referred to herein may be implemented in circuits, software, microcode, or a combination of them.

Various other details may be used in other embodiments.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." Likewise, that A is responsive to B, does not mean it is not also responsive to C.

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The invention is not restricted to the particular details described herein. Indeed, many other variations of the foregoing description and drawings may be made within the scope of the present invention. Accordingly, it is the following claims including any amendments thereto that define the scope of the invention.

What is claimed is:

1. A system comprising:
a first computer system including a first Central Processing Unit (CPU), a first memory controller, a first memory module to which the first memory controller writes data, and a first inter-computer transfer interface in the first CPU; and
a second computer system, including a second CPU, a second memory controller, a second memory module, and a second inter-computer transfer interface in the second CPU, wherein the first and second computer systems operate in lockstep running a user application concurrently, wherein while concurrently running the user application at the first and the second computer systems, during a first write transaction and a second write transaction to the first and second memory modules, respectively, that are occurring concurrently, write information including the data being written, from the first and second write transactions are compared, wherein the first inter-computer transfer interface and the second inter-computer transfer interface exchange the write information over an interconnect between the first and second inter-computer transfer interfaces to compare information about the first and second write transactions, wherein during a next checkpoint operation between the first computer system and the second computer system to compare a CPU state, the first and second memory modules are not compared because changed values are compared when comparing the write information over the interconnect when running the user application and writing the changed values to the first and second memory modules.

2. The system of claim 1, wherein the first write transaction is duplicated through the second memory controller to the second memory module in the second computer system.

3. The system of claim 1, further comprising third and fourth sets of memory modules, wherein a first set of memory modules includes the first memory module and wherein a second set of memory modules includes the second memory module, wherein the first and third sets of memory modules are used for mirrored memory for the first computer system and wherein the second and fourth sets of memory modules are used for mirrored memory for the second computer system.

4. The system of claim 3, wherein the second inter-computer transfer interface transfers data from the interconnect to the second and fourth sets of memory modules to maintain two copies of the data in the second and fourth sets of memory modules from each write operation at the first computer system.

5. The system of claim 3, wherein the first and second inter-computer transfer interfaces compare the write information from the first and second write transactions.

6. The system of claim 1, wherein the first inter-computer transfer interface is included on a die which also includes the first CPU.

7. The system of claim 1, wherein during the next checkpoint operation the first and second memory modules are not compared because all write accesses to the first memory module were compared during the lockstep.

8. The system of claim 1, wherein at least one of the first and the second inter-computer transfer interfaces compares the write information about the first and second write transactions.

9. A method comprising:
operating in lockstep to run a user application concurrently by a first computer system including a first Central Processing Unit (CPU), a first memory controller, a first memory module to which the first memory controller writes data, and a first inter-computer transfer interface in the first CPU and a second computer system, including a second CPU, a second memory controller, and a second memory module, and a second inter-computer transfer interface in the second CPU,
comparing, while concurrently running the user application at the first computer system, during a first write transaction and a second write transaction to the first and second memory modules, respectively, that are occurring concurrently, write information, including the data being written, from the first and second write transactions;
exchanging, by the first inter-computer transfer interface and the second inter-computer transfer interface, the write information over an interconnect between the first and second inter-computer transfer interfaces to compare information about the first and second write transactions; and
during a next checkpoint operation between the first computer system and the second computer system, comparing a CPU state, wherein during the next checkpoint operation, first and second memory modules are not compared because changed values are compared when comparing the write information over the interconnect when running the user application and writing the changed values to the first and second memory modules.

10. The method of claim 9, wherein at least one of the first and second inter-computer transfer interfaces receives the write information and compares the write information during the lockstep.

11. The method of claim 10, further comprising:
providing, by the second inter-computer transfer interface, the write information about write transactions of the second computer system to the first inter-computer transfer interface; and
comparing, by the first computer system, at least some of the write information from the second inter-computer transfer interface with the write information about write transactions of the first computer system during the lockstep.

12. The method of claim 11, further comprising:
comparing in the second inter-computer transfer interface; and
providing, by the second inter-computer transfer interface, wherein information regarding write operations for the second memory controller over the interconnect to the first inter-computer transfer interface; and
comparing in the first inter-computer transfer interface.

13. The method of claim 9, further comprising first, second, third, and fourth sets of memory modules, wherein the first set of memory modules includes the first memory module and wherein the second set of memory modules includes the second memory module, wherein the first and third sets of memory modules are used for mirrored memory for the first computer system and wherein the second and fourth sets of memory modules are used for mirrored memory for the second computer system.

14. The method of claim 9, wherein the first inter-computer transfer interface is included on a die which also includes the first CPU.

15. An apparatus comprising:
a first computer system including a first Central Processing Unit (CPU), a first memory controller, a first memory module to which the first memory controller writes data, and a first inter-memory transfer interface in the first memory module to receive memory write transactions of a first computer system; and a second computer system including a second CPU, a second memory controller, a second memory module to which the second memory controller writes data, and a second inter-memory transfer interface in the second memory module; and an external interconnect coupled to the first and second inter-memory transfer interfaces to transfer first and second information of write transactions to the second and first memory modules, respectively, wherein the first and second computer systems operate in lockstep running a user application concurrently, wherein while concurrently running the user application at the first and the second computer systems, during a first write transaction and a second write transaction to the first and second memory modules, respectively, that are occurring concurrently, write information, including the data being written, from the first and second write transactions are compared, wherein during a next checkpoint operation between the first computer system and the second computer system to compare a CPU state, the first and second memory modules are not compared because changed values are compared when comparing the write information over the external interconnect when running the user application and writing the changed values to the first and second memory modules.

16. The apparatus of claim 15, wherein the first memory controller is included on a die and the first inter-memory transfer interface is included on the die.

17. The apparatus of claim 15, wherein the first and second inter-memory transfer interfaces transfer at least some of the second information to the first memory module in the first computer system.

18. The apparatus of claim 15, wherein the first and second inter-memory transfer interfaces compare at least some of the write information for the second write transaction with at least some of the write information for the first write transaction.

19. The apparatus of claim 15, further comprising first, second, third, and fourth sets of memory modules, wherein the first set of memory modules includes the first memory module and wherein the second set of memory modules includes the second memory module, wherein the first and third sets of memory modules are used for mirrored memory for the first computer system and wherein the second and fourth sets of memory modules are used for mirrored memory for the second computer system.

20. The apparatus of claim 19, wherein the first memory controller in the first computer system writes to the first set of memory modules, wherein a third memory controller in the first computer system writes to the third set of memory modules, wherein the second memory controller in the second computer system writes to the second set of memory modules, wherein a fourth memory controller in the second computer system writes to the fourth set of memory modules, wherein concurrently with the writes of data by the third memory controller to the third set of memory modules, the first CPU writes data to the first inter-memory transfer interface to transfer the data to the second inter-memory transfer interface in the second computer system, wherein the second inter-memory transfer interface writes the data to the second set of memory modules in the second computer system, and wherein the second CPU writes the data written to the second set of memory modules transferred over the external interconnect to the fourth set of memory modules.

21. The apparatus of claim 19, wherein the first memory controller in the first computer system writes to the first set of memory modules, wherein a third memory controller in the first computer system that writes to the third set of memory modules, wherein the second memory controller in the second computer system writes data to the second set of memory modules, wherein a fourth memory controller in the second computer system writes to the fourth set of memory modules, wherein concurrently with the writes of data by the third memory controller to the third set of memory modules, the first CPU writes data to the first inter-memory transfer interface to transfer the data to the second inter-memory transfer interface in the second computer system, wherein data transferred through the second inter-memory transfer interface and written to the second set of memory modules is not copied to the fourth set of memory modules.

22. The apparatus of claim 15, wherein the first and second inter-memory transfer interfaces compare the write information from the first and second write transactions.

23. The apparatus of claim 15, wherein during the next checkpoint operation the first and second memory modules are not compared because all write accesses to the first memory module were compared during the lockstep.

24. The apparatus of claim 15, wherein at least one of the first and the second inter-memory transfer interfaces compares the write information from the first and second write transactions.

* * * * *